US005357436A

United States Patent [19]

Chiu

[11] Patent Number: 5,357,436

[45] Date of Patent: Oct. 18, 1994

[54] FUZZY LOGIC TRAFFIC SIGNAL CONTROL SYSTEM

[75] Inventor: Stephen L. Chiu, Thousand Oaks, Calif.

[73] Assignee: Rockwell International Corporation, Seal Beach, Calif.

[21] Appl. No.: 964,319

[22] Filed: Oct. 21, 1992

[51] Int. Cl.[5] .............................................. G06F 15/48

[52] U.S. Cl. ..................................... 364/436; 340/916

[58] Field of Search .................. 364/436; 340/40, 916, 340/917, 918

[56] References Cited

PUBLICATIONS

C. Pappis and Mamdani, "A Fuzzy Logic Controller for a Traffic Junction," IEEE Trans. on Systems, Man, and Cybernetics, vol. SMC-7, No. 10, pp. 707-717, Oct. 1977.

N. Findler and J. Stapp, "Distributed Approach to Optimitzed Control of Street Traffic Signals," Jour. of Transportation Engineering, vol. 118, No. 1, pp. 99-110, Jan./Feb. 1992.

*Primary Examiner*—Thomas G. Black
*Assistant Examiner*—Susan Wieland
*Attorney, Agent, or Firm*—John C. McFarren

[57] ABSTRACT

A traffic signal network is controlled by an adaptive, fuzzy logic based, distributed system of microprocessors. The system can control multiple intersections in a network of two-way streets. Traffic signal timing at each intersection is be defined by signal control parameters such as cycle time, phase split, and offset time. Local traffic flow data is input to each microprocessor and characterized by membership functions. Fuzzy logic decision rules are applied to the characterized data and used to adjust the signal control parameters at each intersection as a function of the local traffic conditions and the signal parameters in effect at neighboring intersections. Cycle time is adjusted to maintain a good degree of saturation, and phase split is adjusted to achieve similar degrees of saturation on competing approaches. The offset time at each intersection is coordinated with the neighboring intersections and adjusted gradually to optimize traffic flow in the dominant direction. The amount of change in the control parameters during each cycle may be limited to a small fraction of the current parameters to ensure smooth transition. Microprocessor controllers can be installed individually and incrementally into an area and coexist with current signal controllers, and control parameters, membership functions, and decision rules may be modified and extended as necessary.

15 Claims, 2 Drawing Sheets

FUZZY LOGIC TRAFFIC SIGNAL CONTROL SYSTEM

TECHNICAL FIELD

The present invention relates to traffic signal control systems and, in particular, to a distributed, self-organizing, fault-tolerant traffic signal control system using fuzzy logic.

BACKGROUND OF THE INVENTION

Traffic signals in current use typically operate on a preset timing schedule. The most common traffic control system used in the United States is the Urban Traffic Control System (UTCS), developed by the Federal Highway Administration in the 1970's. UTCS uses a central computer to generate timing schedules off-line based on average traffic conditions for a specific time of day. The schedules are then downloaded to local controllers at the appropriate time of day. Timing schedules are typically obtained either by maximizing the bandwidth on arterial streets or by minimizing a disutility index, such as a measurement of stops and delays. Computer programs such as MAXBAND and TRANSYT-7F are well established means for performing these optimizations.

The off-line, global optimization approach used by UTCS has limitations in responding to unpredictable changes in traffic demand. With the availability of inexpensive microprocessors, several real-time adaptive traffic control systems were developed in the late 1970's and early 1980's to address this problem. These systems can respond to changing traffic demand by performing incremental optimizations at the local level. The most notable of these are the "Sydney Coordinated Adaptive Traffic System" (SCATS), developed in Australia, and the "Split Cycle and Offset Optimizing Technique" (SCOOT), developed in England. SCATS is installed in several major cities in Australia, New Zealand, and Asia. SCOOT is installed in over 40 cities, 8 of which are outside England.

Both SCATS and SCOOT are complicated, real-time systems that manage large traffic signal networks. These systems provide predetermined, incremental changes in the cycle time, phase split, and offset of traffic signals in their networks. Cycle time is defined as the duration for completing all phases of a signal. Phase split is the division of the cycle time into periods of green signals for the competing approaches. Offset is the time relationship between the start of each phase among adjacent intersections.

SCATS organizes groups of intersections into subsystems. Each subsystem contains only one critical intersection whose timing parameters are adjusted directly by a regional computer based on the average prevailing traffic condition for the area. The basic traffic data used by SCATS is the "degree of saturation," defined as the ratio of the effectively used green time to the total available green time. Cycle time for the critical intersection is adjusted to maintain a high degree of saturation for the lane with the greatest degree of saturation. Phase split for the critical intersection is adjusted to maintain equal degrees of saturation on competing approaches. All other intersections in the subsystem are coordinated with the critical intersection, sharing a common cycle time and having coordinated phase split and offset. Subsystems may be linked to form a larger coordinated system when their cycle times are nearly equal. At the lower level, each intersection can independently shorten or omit a particular phase based on local traffic demand. However, any time saved by ending a phase early must be added to the subsequent phase to maintain a common cycle time among all intersections in the subsystem. The offsets among the intersections in a subsystem are selected to eliminate stops in the direction of dominant traffic flow.

SCOOT uses real-time traffic data collected by sensors located far upstream from a signal to generate traffic flow models, called "cyclic flow profiles." Cyclic flow profiles are used to estimate how many vehicles will arrive at a downstream signal when that signal is red. This estimate provides predictions of queue size for different hypothetical changes in the signal timing parameters. The objective of SCOOT is to minimize the sum of the average queues in an area. A few seconds before every phase change, SCOOT uses the flow model to determine whether the phase change should be advanced by 4 seconds, remain unaltered, or be retarded by 4 seconds. Once each cycle, SCOOT also determines whether the offset should be advanced by 4 seconds, remain unaltered, or be retarded by 4 seconds. Once every few minutes, SCOOT determines whether the common cycle time of all intersections grouped in a subsystem should be incremented, unchanged, or decremented by a few seconds. Thus, SCOOT changes its timing parameters in predetermined, fixed increments to optimize an explicit performance objective.

In designing a traffic control system, a specific performance objective will not provide an optimum solution for all traffic conditions. For example, maximizing bandwidth on arterial streets may cause extended wait times for vehicles on cross streets. On the other hand, minimizing delays and stops generally does not result in maximum bandwidth. This problem is typically addressed by the use of weighting factors. For example, the TRANSYT optimization program provides user-selectable, link-to-link flow weighting factors, stop weighting factors, and delay weighting factors. A traffic engineer can vary these weighting factors until the signal scheduling and planning program produces a good compromise solution (based on human judgment). In view of the uncertainty in defining a suitable performance measure, it appears that a reactive type of control, such as provided by SCATS, where there is no explicit effort to optimize any specific performance measure, might produce performance characteristics that more closely match a human's idea of "good" traffic management.

Because prior traffic signal systems that rely on centralized or regional computer control do not respond well to unpredicted changes in traffic demand and become ineffective when the central or regional computer fails, there is a need for an adaptive, serf-organizing, fault-tolerant traffic signal control system that is based on local traffic data and localized computer control.

SUMMARY OF THE INVENTION

The present invention comprises a distributed, microprocessor-based, adaptive traffic signal control system that uses fuzzy logic. The system can control multiple intersections in a network of two-way streets. Traffic signal timing at each intersection may be defined by the signal parameters of cycle time, phase split, and offset time. Traffic flow data is input to the system and characterized by membership functions. Fuzzy logic decision rules are applied to the characterized data to adjust the signal timing parameters at each intersection as a function of the local traffic conditions and the signal parameters in effect at neighboring intersections. Cycle time is adjusted to maintain a good degree of saturation, and phase split is adjusted to achieve similar degrees of saturation on competing approaches. The offset at each intersection is coordinated with the neighboring intersections and adjusted incrementally to optimize traffic flow in the dominant direction. Thus, the signal timing parameters evolve dynamically to improve traffic flow by using local traffic information. The amount of change in the traffic control parameters during each cycle may be limited to a small fraction of the current parameters to ensure smooth transition.

The present invention provides a fault-tolerant traffic management system in which traffic is managed by the collective actions of simple microprocessors located at each intersection. Microprocessor failure at a small number of intersections has minimal effect on overall network performance. Because they require only local traffic data for operation, the microprocessors can be installed individually and incrementally into an area and coexist with current traffic signal controllers. The distributed approach of the present invention provides a fault-tolerant, highly responsive traffic management system. The effectiveness of the method has been demonstrated through simulation of traffic flow in a model network of controlled intersections.

A principal object of the invention is improved traffic flow through signal controlled intersections. A feature of the invention is a fuzzy logic based microprocessor traffic signal controller at each intersection. An advantage of the invention is a distributed, fault-tolerant, self-organizing traffic control system that can be installed incrementally and coexist with current control systems.

BRIEF DESCRIPTION OF THE DRAWINGS

For a more complete understanding of the present invention and for further advantages thereof, the following Detailed Description of the Preferred Embodiment makes reference to the accompanying Drawings, in which.

DETAILED DESCRIPTION OF THE PREFERRED EMBODIMENT

Figure 1:
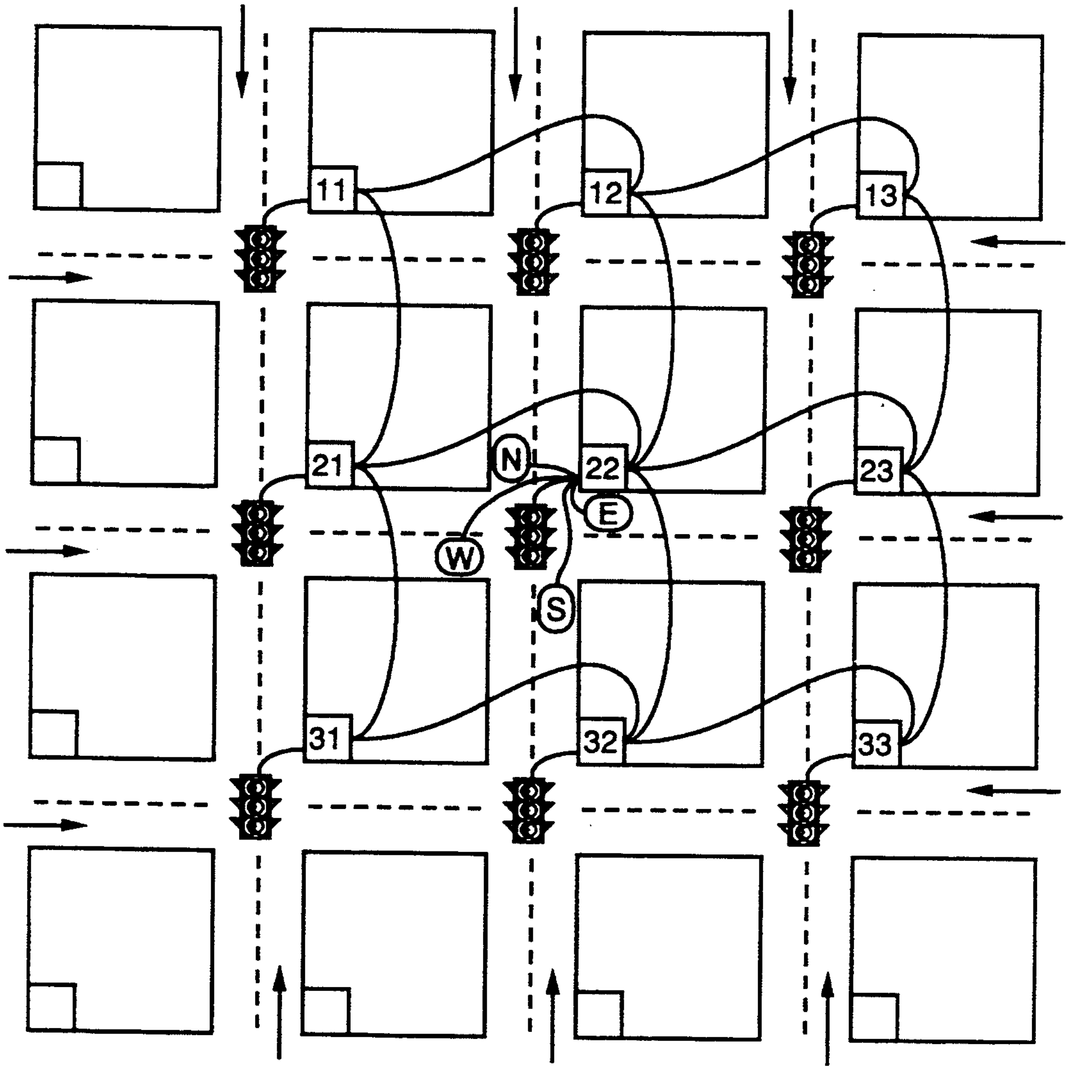
FIG. 1 is a schematic diagram of a grid of intersecting streets using the traffic signal control system of the present invention.

The adaptive traffic signal control system of the present invention is illustrated schematically in FIG. 1. A grid or network of intersecting streets is shown with a traffic signal at each intersection. Arrows indicate the direction of automotive traffic for each lane of the intersecting streets. The streets may include multiple lanes controlled by the traffic signals, including dedicated left-turn lanes at the intersections. Each traffic signal is connected to and controlled by a corresponding microprocessor, such as microprocessor 22 connected to one of the traffic signals in the grid of FIG. 1. In the system of the present invention, each microprocessor is connected to the microprocessors corresponding to the local traffic signals at immediately neighboring intersections. For example, microprocessor 22 is connected to microprocessors 12, 21, 23, and 32. Each microprocessor receives traffic signal data from the connected microprocessors and signals at its neighboring intersections.

Each microprocessor is also connected to a plurality of traffic sensors, which are typically embedded in the surface of the streets. For example, microprocessor 22 is connected to traffic sensors N, S, E, and W, corresponding to the north, south, east, and west approaches to the traffic signal controlled by microprocessor 22. Sensors N, S, E, and W provide traffic flow data, such as a count of vehicles passing through the intersection, to microprocessor 22. The microprocessors, traffic signals, and sensors of the network may be connected by underground cables, as is well known in the art.

The microprocessors in the system of the present invention are programmed to operate using fuzzy logic. Fuzzy logic is based on the representation of linguistic descriptions of system parameters as "membership functions," examples of which are illustrated graphically in FIGS. 2A–E. Membership functions characterize the degree to which a given value of a controlled parameter belongs to the class labeled by the linguistic description. After input data have been characterized by membership functions, the control parameters are adjusted according to fuzzy decision rules.

In fuzzy logic systems, fuzzy decision rules are typically expressed in the form:

If $X_1$ is $A_{i,1}$ and $X_2$ is $A_{i,2}$, then U is $B_i$, where $X_1$ and $X_2$ are inputs to a controller, U is an output, the A's and B's are membership function characterizations of the inputs and outputs, and the subscript i denotes the rule number. Given input values of $X_1$ and $X_2$, the "degree of fulfillment" (DOF) of rule i is given by the minimum of the degrees of satisfaction of the individual antecedent clauses, i.e., $$DOF_i = Min\ \{A_{i,1}(X_1),\ A_{i,2}(X_2)\}.$$

The output value U is computed by:

$$U = \frac{\sum_{i=1}^{n} (DOF_i)B_i^d}{\sum_{i=1}^{n} (DOF_i)},$$

where $B_i^d$ is the "defuzzified" value of the membership function characterization $B_i$, and n is the number of rules. The defuzzified value of a membership function is the single value that best represents the linguistic description. Typically, the abscissa of a membership function's centroid is taken as its defuzzified value. In essence, each rule contributes a conclusion weighted by the degree to which the antecedent of the rule is fulfilled. The final control decision is obtained as the weighted average of all the contributed conclusions. Although there are several variant methods of fuzzy inference computation, the above method has gained popularity in control applications due to its computational and analytical simplicity.

In the model described herein as an example of the adaptive traffic control system of the present invention, a set of 40 fuzzy decision rules was developed for adjusting the traffic signal control parameters. In this model, the rules for adjusting the parameters of cycle time, phase split, and offset were decoupled so that the parameters could be adjusted independently, which greatly simplified the rule base. Although independent adjustment of these parameters could result in one parameter change working against another, no conflict was evident in simulations under various traffic conditions. Since incremental adjustments were made at every phase change, conflicting adjustments were likely absorbed by the numerous successive adjustments. An advantage of the fuzzy logic control system of the present invention is the ease and flexibility in defining control parameters, establishing membership functions, and developing fuzzy decision rules. Thus, the parameters, functions, and rules described herein, which are given as examples and are not limited to those specified, may be modified and expanded to provide a customized control system for a particular traffic network. Furthermore, the use of a fuzzy logic based control system provides continuous, smooth transitions of signal timing as traffic conditions change, resulting in gradually improved coordination of intersections to minimize stops in the direction of dominant traffic flow.

In the model, cycle time was adjusted to maintain a good degree of saturation on the approach to the intersection with the highest saturation. The degree of saturation for a given approach is defined as the actual number of vehicles that passed through the intersection during the green period divided by the maximum number of vehicles that can pass through the intersection during that period. Thus, the degree of saturation is a measure of how effectively the green period is being used. The primary reason for adjusting cycle time to maintain a given degree of saturation is not to ensure efficient use of green periods, but to control delay and stops. When traffic volume is low, the cycle time must be reduced to maintain a given degree of saturation; this results in short cycle times that reduce the delay in waiting for phase changes. When the traffic volume is high, the cycle time must be increased to maintain the same degree of saturation; this results in long cycle times that reduce the number of stops.

Figure 2A:
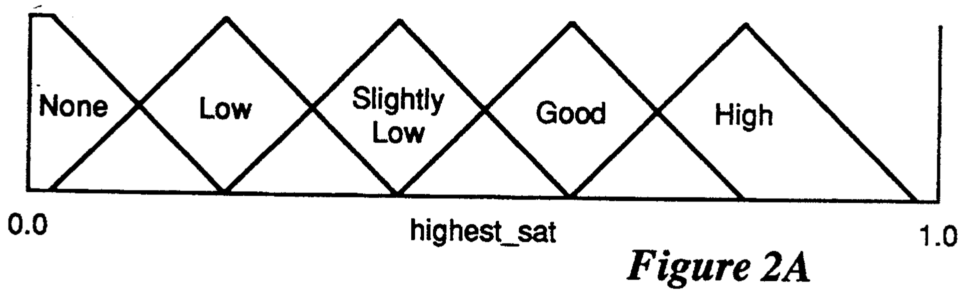
FIGS. 2A–E are graphical representations of membership functions for various traffic control parameters processed by the system of the present invention.
Figure 2B:
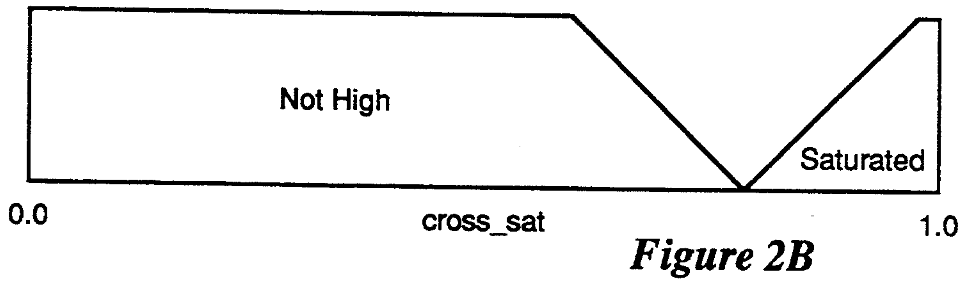
Figure 2C:
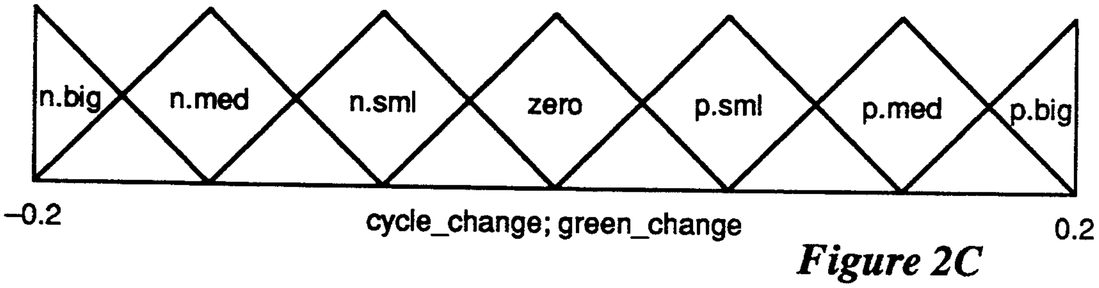
Figure 2D:
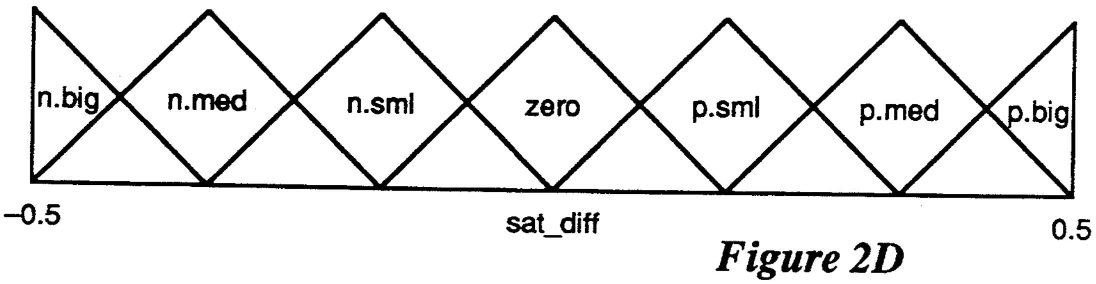

The rules used for adjusting the cycle time in the model are shown below in Table 1, and the corresponding membership functions are shown in FIGS. 2A-C. The inputs to the rules were: (1) the highest degree of saturation on any approach (denoted as "highest_sat" in the rules), and (2) the highest degree of saturation on its competing approaches (denoted as "cross_sat"). The output of the rules is the mount of adjustment to the current cycle time, expressed as a fraction of the current cycle time. The maximum adjustment allowed was 20% of the current cycle time. The rules basically adjusted the cycle time in proportion to the deviation of the degree of saturation from the desired saturation value. However, when the highest saturation was high and the saturation on the competing approach was low, phase split adjustments became primarily responsible for alleviating the high saturation.

TABLE 1

| Rules for Adjusting Cycle Time | |
|---|---|
| If highest_sat is none, | then cycl_change is n.big; |
| If highest_sat is low, | then cycl_change is n.med; |
| If highest_sat is slightly low, | then cycl_change is n.sml; |
| If highest_sat is good, | then cycl_change is zero; |
| If highest_sat is high and cross_sat is not high, | then cycl_change is p.sml; |
| If highest_sat is high and cross_sat is high, | then cycl_change is p.med; |
| If highest_sat is saturated, | then cycl_change is p.big. |

In the model, phase split was adjusted to maintain equal degrees of saturation on competing approaches. The rules for adjusting the phase split are shown below in Table 2, and the corresponding membership functions are shown in FIGS. 2A, C, and D. The inputs to the rules were: (1) the difference between the highest degree of saturation on the east-west approaches and the highest degree of saturation on the north-south approaches ("sat_diff"), and (2) the highest degree of saturation on any approach ("highest_sat"). The output of the rules was the mount of adjustment to the current east-west green period, expressed as a fraction of the current cycle time. Subtracting time from the east-west green period is equivalent to adding an equal amount of time to the north-south green period. When the saturation difference was large and the highest degree of saturation was high, the green period was adjusted by a large amount to both reduce the difference and alleviate the high saturation. When the highest degree of saturation was low, the green period was adjusted by only a small amount to avoid excessive reduction in the degree of saturation.

TABLE 2

| Rules for Adjusting Phase Split | |
|---|---|
| If sat_diff is p.big and highest_sat is saturated, | then green_change is p.big; |
| If sat_diff is p.big and highest_sat is high, | then green_change is p.big; |
| If sat_diff is p.big and highest_sat is not high, | then green_change is p.med; |
| If sat_diff is n.big and highest_sat is saturated, | then green_change is n.big; |
| If sat_diff is n.big and highest_sat is high, | then green_change is n.big; |
| If sat_diff is n.big and highest_sat is not high, | then green_change is n.med; |
| If sat_diff is p.med and highest_sat is saturated, | then green_change is p.med; |
| If sat_diff is p.med and highest_sat is high, | then green_change is p.med; |
| If sat_diff is p.med and highest_sat is not high, | then green_change is p.sml; |
| If sat_diff is n.med and highest_sat is saturated, | then green_change is n.med; |
| If sat_diff is n.med and highest_sat is high, | then green_change is n.med; |
| If sat_diff is n.med and highest_sat is not high, | then green_change is n.sml; |
| If sat_diff is p.sml, | then green_change is p.sml; |
| If sat_diff is n.sml, | then green_change is n.sml; |
| If sat_diff is zero, | then green_change is zero. |

Figure 2E:
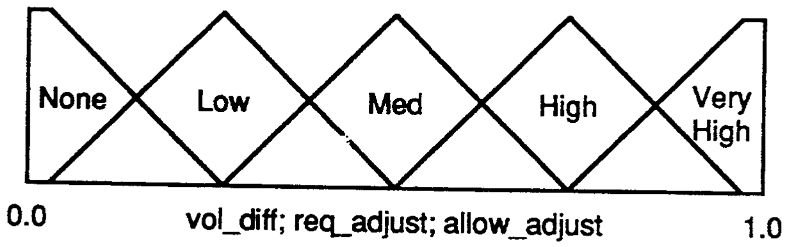

In the model, offset was adjusted to coordinate adjacent signals in a way that minimized stops in the direction of dominant traffic flow. The controller first determined the dominant direction from the vehicle count for each approach. Based on the next green time of the upstream intersection, the arrival time of a vehicle platoon leaving the upstream intersection was calculated. If the local signal became green at that time, then the vehicles would pass through the local intersection unstopped. The required local adjustment to the time of the next phase change was calculated based on this target green time. Fuzzy rules were then applied to determine what fraction of the required adjustment could be reasonably executed in the current cycle. The rules used in the model for determining the allowable offset time adjustment are shown below in Table 3, and the corresponding membership functions are shown in FIG. 2E. The inputs to the rules were: (1) the normalized difference between the traffic volume in the dominant direction and the average volume in the remaining directions ("vol_diff"), i.e., $(vol._{dom} - vol._{avg})/vol._{dom}$;

and (2) the required time adjustment relative to the adjustable amount of time ("req_adjust"), i.e., the amount by which the current green phase was to be ended early divided by the current green period. The output of the rules was the allowable adjustment, expressed as a fraction of the required amount of adjustment. These rules allowed a large fraction of the adjustment to be made when there was a significant advantage to be gained by coordinating the flow in the dominant direction and when the adjustment could be made without significant disruption to the current schedule.

TABLE 3

Rules for Adjusting Offset Time

| | |
|---|---|
| If vol_diff is none, | then allow_adjust is none; |
| If req_adjust is very high, | then allow_adjust is none; |
| If vol_diff is very high and req_adjust is none, | then allow_adjust is very high; |
| If vol_diff is very high and req_adjust is low, | then allow_adjust is very high; |
| If vol_diff is very high and req_adjust is medium, | then allow_adjust is high; |
| If vol_diff is very high and req_adjust is high, | then allow_adjust is medium; |
| If vol_diff is high and req_adjust is none, | then allow_adjust is very high; |
| If vol_diff is high and req_adjust is low, | then allow_adjust is very high; |
| If vol_diff is high and req_adjust is medium, | then allow_adjust is high; |
| If vol_diff is high and req_adjust is high, | then allow_adjust is low; |
| If vol_diff is medium and req_adjust is none, | then allow_adjust is very high; |
| If vol_diff is medium and req_adjust is low, | then allow_adjust is high; |
| If vol_diff is medium and req_adjust is medium, | then allow_adjust is medium; |
| If vol_diff is medium and req_adjust is high, | then allow_adjust is low; |
| If vol_diff is low and req_adjust is none, | then allow_adjust is high; |
| If vol_diff is low and req_adjust is low, | then allow_adjust is medium; |
| If vol_diff is low and req_adjust is medium, | then allow_adjust is low; |
| If vol_diff is low and req_adjust is high, | then allow_adjust is low. |

Simulation was performed to verify the effectiveness of the distributed fuzzy control scheme used in the model of the present invention. The simulation considered a small network of intersections similar to that illustrated in FIG. 1. A mean vehicle arrival rate was assigned to each end of a street. At every simulation time step, a random number was generated for each lane of a street and compared with the assigned vehicle arrival rate to determine whether a vehicle should be added to the beginning of the lane. The following simplifying assumptions were used in the simulation model: (1) unless stopped, a vehicle always moved at the speed prescribed by the speed limit of the street, (2) a vehicle could not change lanes, and (3) a vehicle could not turn. Vehicle counters were assumed to be installed in all lanes of a street at each intersection. When the green phase began for a given approach, the number of vehicles passing through the intersection during the green period was counted. The degree of saturation for each approach was then calculated from the vehicle count and the length of the green period. At the start of each phase change, the controller computed the nominal time of the next phase change using its current cycle time and phase split values. The fuzzy decision rules were then applied to adjust the time of the next phase change according to the offset adjustment rules; the adjusted cycle time and phase split values were used only in the subsequent computation of the nominal next phase change time.

The simulations of the model described above involved a highly distributed architecture where the timing parameters at each intersection were adjusted using only local information and where each intersection coordinated only with adjacent intersections. Although this localized approach simplifies incremental integration of a fuzzy controller into existing traffic systems, the simulation results showed that the effectiveness of a small number of intersections using the adaptive control system of the present invention is limited if the adaptive control intersections operate at a cycle time widely different from that of the fixed intersections. However, constraining the adaptive controllers to maintain a fixed cycle time that matches the existing system provides measurably better overall performance with respect to average waiting time and number of stops. For a traffic system in which all intersections are adaptive, it has not yet been determined whether better performance is achieved by constraining all intersections to share a common variable cycle time. The flexibility of fuzzy decision rules, however, greatly simplifies system modifications, improvements, and extensions, such as including queue length as an input and using trend data for predictive control. Furthermore, the use of a fuzzy logic based control system provides continuous, smooth transitions of signal timing as traffic conditions change, resulting in a gradual improvement in coordination of intersections to minimize stops in the direction of dominant traffic flow and a gradual change in the coordination pattern as the direction of dominant flow shifts.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

I claim:

1. A method of controlling a traffic signal at an intersection, comprising the steps of:

providing a microprocessor connected to the traffic signal;

defining control parameters of cycle time, phase split, and offset time for the traffic signal;

generating data of traffic flow through the intersection and a neighboring intersection, said data including direction of dominant traffic flow through the intersection and degree of saturation on competing approaches to the intersection;

characterizing said traffic flow data using membership functions;

applying fuzzy logic decision rules to said characterized traffic flow data; and adjusting said traffic signal control parameters based on said fuzzy logic decision rules applied to said characterized traffic flow data, including the steps of adjusting said phase split to reduce the difference between saturation on said competing approaches to the intersection, adjusting said cycle time to maintain a desired degree of saturation on one of said approaches having the highest saturation, and adjusting said offset time incrementally to improve traffic flow in said dominant direction.

2. The method of claim 1, further comprising the steps of:

providing a plurality of microprocessors, each of said microprocessors connected to one of a corresponding plurality of traffic signals in a network of intersections;

connecting each of said microprocessors to microprocessors at neighboring intersections in said network; and providing data to each of said microprocessors from said connected microprocessors at said neighboring intersections.

3. The method of claim 1, wherein the step of adjusting said phase split further comprises the step of defining saturation on an approach to the intersection as an actual number of vehicles on said approach passing through the intersection during a green phase divided by a maximum number of vehicles that can pass through the intersection during said green phase.

4. The method of claim 3, wherein the step of adjusting said offset time further comprises applying said fuzzy logic decision rules to determine what fraction of a required adjustment can be executed in a current cycle.

5. The method of claim 4, wherein the step of adjusting said traffic signal control parameters comprises gradually adjusting said parameters to reduce average waiting time and number of stops in a direction of dominant traffic flow.

6. A method of fuzzy logic control for a plurality of microprocessor controlled traffic signals at a corresponding plurality of intersections, the method for each of said traffic signals comprising the steps of:

generating data of traffic flow through said intersection, said data including direction of dominant traffic flow through said intersection and degree of saturation on competing approaches to said intersection;

defining control parameters of cycle time, phase split, and offset time for said traffic signal;

specifying a plurality of fuzzy logic membership functions and decision rules;

characterizing said traffic flow data using said fuzzy logic membership functions;

applying said fuzzy logic decision rules to said characterized traffic flow data; and adjusting said traffic signal control parameters based on said fuzzy logic decision rules applied to said characterized traffic flow data, including the steps of adjusting said phase split to reduce the difference between saturation on said competing approaches to said intersection, adjusting said cycle time to maintain a desired degree of saturation on one of said approaches having the highest saturation, and adjusting said offset time incrementally to improve traffic flow in said dominant direction.

7. The method of claim 6, further comprising the steps of:

connecting each of said microprocessors to microprocessors at neighboring intersections; and providing traffic signal data to each of said microprocessors from said connected microprocessors at said neighboring intersections.

8. The method of claim 7, wherein the step of adjusting said phase split further comprises defining saturation on an approach to said intersection as an actual number of vehicles on said approach passing through said intersection during a green phase divided by a maximum number of vehicles that can pass through said intersection during said green phase.

9. The method of claim 8, wherein the step of adjusting said offset time further comprises applying said fuzzy logic decision rules to determine what fraction of a required adjustment can be executed in a current cycle.

10. The method of claim 9, wherein the step of adjusting said traffic signal control parameters comprises gradually adjusting said parameters to reduce average waiting time and number of stops in a direction of dominant traffic flow.

11. A distributed, fuzzy logic traffic signal control system for a plurality of intersections, comprising:

a plurality of distributed microprocessors, each of said microprocessors connected to a corresponding traffic signal at one of the plurality of intersections;

means for generating data of traffic flow through each of the intersections;

each of said microprocessors controlling parameters of cycle time, phase split, and offset time for said corresponding traffic signal;

a plurality of fuzzy logic membership functions and decision rules provided to said microprocessors;

said microprocessors applying said membership functions to characterize said traffic flow data; and means for adjusting said control parameters for each of said traffic signals based on said fuzzy logic decision rules applied to said characterized traffic flow data, including means for adjusting said phase split of each of said traffic signals to reduce the difference between saturation on said competing approaches to said corresponding intersection, adjusting said cycle time of each of said traffic signals to maintain a desired degree of saturation on one of said approaches to said corresponding intersection having the highest saturation, and adjusting said offset time of each of said traffic signals incrementally to improve traffic flow in said dominant direction of said corresponding intersection.

12. The traffic signal control system of claim 11, further comprising:

means for connecting each of said microprocessors to microprocessors at neighboring intersections; and means for providing traffic signal data to each of said microprocessors from said connected microprocessors at said neighboring intersections.

13. The traffic signal control system of claim 12, wherein said phase split adjusting means includes means for defining saturation on an approach to said corresponding intersection as an actual number of vehicles on said approach passing through said corresponding intersection during a green phase divided by a maximum number of vehicles that can pass through said corresponding intersection during said green phase.

14. The traffic signal control system of claim 13, wherein said offset time adjusting means further comprises means for applying said fuzzy logic decision rules to determine what fraction of a required adjustment can be executed in a current cycle.

15. The traffic signal control system of claim 14, wherein said microprocessors include means for controlling each of said corresponding traffic signals by gradually adjusting said control parameters to reduce average waiting time and number of stops in a direction of dominant traffic flow.

* * * * *